May 28, 1935. H. T. BENNETT 2,003,237
PROCESS OF TREATING MINERAL OILS WITH SELECTIVE SOLVENTS
Filed June 23, 1933
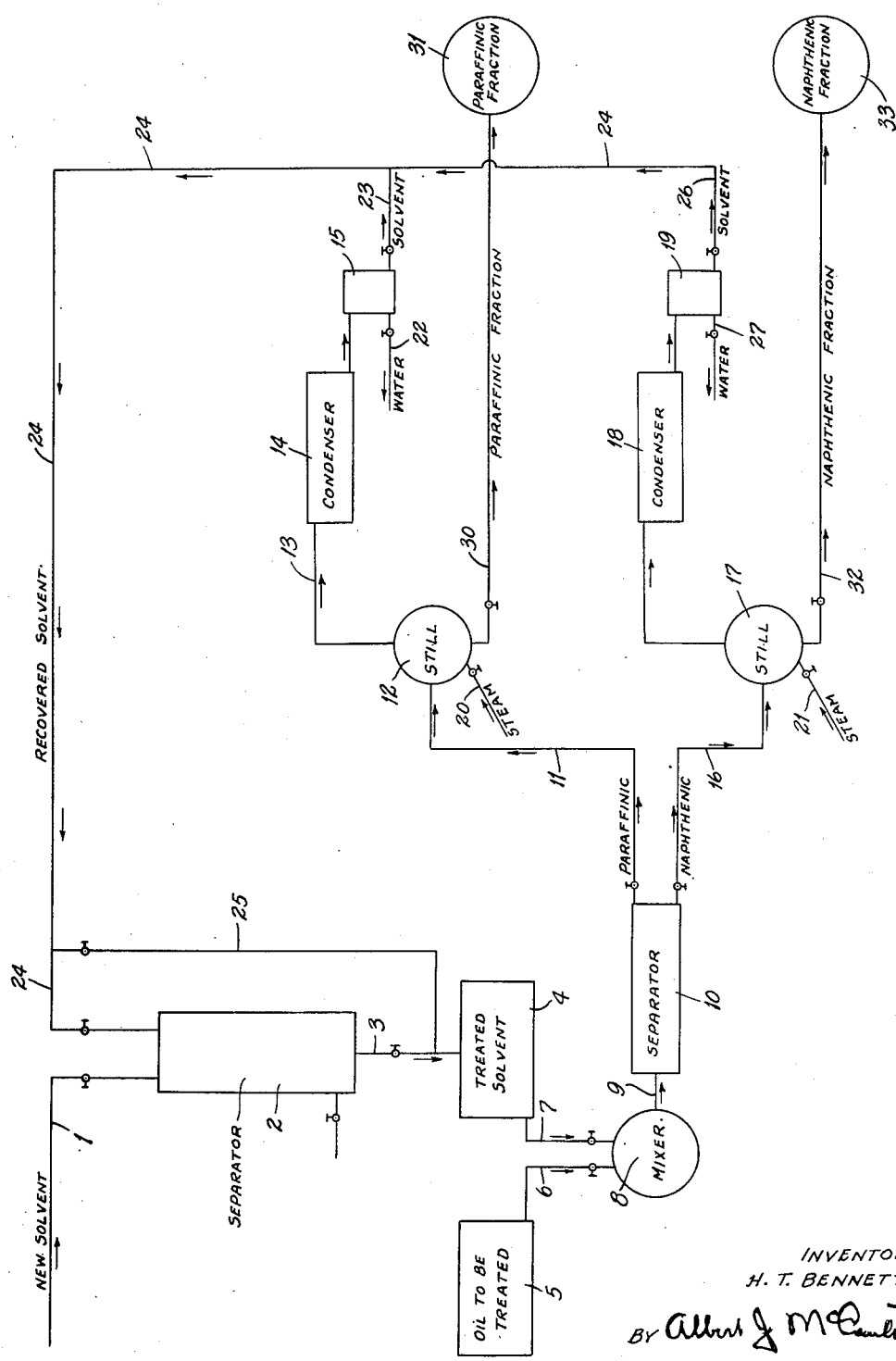
INVENTOR:
H. T. BENNETT.
By Albert J. McCauley
ATTORNEY.

Patented May 28, 1935

2,003,237

UNITED STATES PATENT OFFICE 2,003,237

PROCESS OF TREATING MINERAL OILS WITH SELECTIVE SOLVENTS

Harry T. Bennett, Tulsa, Okla., assignor to Mid-Continent Petroleum Corporation, Tulsa, Okla., a corporation of Delaware Application June 23, 1933, Serial No. 677,256

14 Claims. (Cl. 196—13)

This invention relates to processes of treating mineral oils with selective solvents to effect a separation of the oil into the desired fractions. This application is a continuation in part of an application filed by me on April 21, 1932, Serial No. 606,764.

Mineral oils, including petroleum oils and especially petroleum lubricating oil, contain different constituents which may be separated from each other by treating the oil with a suitable selective solvent, and thereafter separating the selected fraction from the other fraction of the oil. The solvent may be recovered from the oil fractions in any suitable manner, for example, by distilling and treating the fractions with steam.

Various advantages may be obtained by the use of such solvents to improve the quality of a lubricating oil. The paraffinic wax may be removed to improve the pour point of the oil, or the naphthenic portion may be separated from the more valuable paraffinic portion to produce a high viscosity index lubricating oil.

I have found that satisfactory solvents for this kind of work usually contain acid, and are likely to contain a small quantity of dissolved water.

The acid is very objectionable as it will cause corrosion of the equipment, and if the solvent is a chlorinated solvent a substantial quantity of hydrochloric acid therein is likely to begin a corrosive action with the formation of ferric chloride which then acts as a catalyst to increase the corrosion.

Many of the desirable solvents are substantially insoluble in water. However, more or less water is soluble in these solvents depending upon the temperature. The saturation point of the solvent increases in accordance with increases in temperature, and at relatively low temperatures the saturation point of the solvent is decreased. Therefore, at a high temperature the solvent may contain a larger amount of dissolved water than at a lower temperature. If the solvent is cooled, a cloud or haze will appear, indicating that the water in solution is reduced, and that free water exists in the solvent. The temperature at which this occurs is called the cloud point.

The temperature at which an oil is treated with a solvent to effect a separation of the oil into fractions is usually considerably lower than the temperature at which the solvent is separated from the oil fractions. The solvent will, therefore, have a high saturation point when it is being recovered from the oil fractions. Since steam is usually employed as an aid to remove the solvent, the solvent during its recovery will contain a relatively large quantity of dissolved water. When the recovered solvent is cooled and employed to effect a separation of an oil into fractions, the saturation or cloud point of the solvent is reduced and free water may be discharged therefrom. This free water will tend to cause an emulsion, which will interfere with a sharp separation of the fractions of the oil. Under such circumstances, it is difficult to separate the desirable fraction from the other fraction of the oil.

One of the objects of this invention is to provide a highly efficient and effective process and apparatus for removing acid, or dissolved water, from either new or reclaimed solvents.

A further object is to provide a system which will permit the removal of acid and the lowering of the cloud point of the solvent during the continuous reuse of the solvent for separating oils into fractions.

With the foregoing and other objects in view, the invention comprises the novel method, construction, combination and arrangements of parts hereinafter more specifically described and shown in the accompanying drawing, which illustrates one form of the invention. However, it is to be understood that the invention comprehends changes, variations and modifications which come within the scope of the claims hereunto appended.

In the preferred form of the invention BB' dichlorethyl ether is employed as the selective solvent, but other halogenated ethers may be used, and some of the advantages of the present invention may be obtained in using various other solvents including nitrobenzene, aniline, cresol, furfurol, dichlorethylene, trichlorethylene, crotonic aldehyde, etc.

To aid in describing one form of this invention, I will refer to the accompanying drawing which is a diagrammatical view of an apparatus adapted for use in carrying out the invention.

The new solvent enters the system through a conductor 1 and passes through the separator 2, which may contain fullers earth, or other suitable material for removing acid or dissolved water from the solvent. The solvent may then be transmitted through a pipe 3 to a container 4. The oil to be treated may be obtained from a container 5. The oil and solvent may be transmitted through pipes 6 and 7 to a mixer 8. The solvent and oil, after being agitated in the mixer 8, are discharged through a pipe 9 to a separator 10 where the oil separates into fractions more paraffinic and more naphthenic than the original oil.

The more paraffinic fraction with any solvent carried therein may be discharged through a pipe 11 to a still 12 provided with a vapor line 13 leading to a condenser 14 which discharges into a tank 15.

The naphthenic solution, discharged from the separator 10, likewise passes through a pipe 16 leading to a still 17 provided with a condenser 18 discharging into a tank 19.

The solvent and oil in the stills 12 and 17 are preferably subjected to distillation under a vacuum, and a large portion of the solvent will be freely vaporized and discharged to the condensers, without injecting steam into the stills. However, as the distillation progresses, steam or an inert gas may be introduced through pipes 20 and 21, respectively, to remove approximately all of the solvent from the oil fractions.

The paraffinic fraction of the oil may be discharged from the still 12 through a pipe 30 into the storage tank 31. The naphthenic fraction may be transmitted from still 17 through a pipe 32 to a storage tank 33.

The water and solvent discharged from the condenser 14 flow into the tank 15 where they may be permitted to settle by gravity. This tank 15 is equipped with a pipe 22 for the discharge of water, and a pipe 23 through which the recovered solvent is transmitted to return pipe 24.

The run-down tank 19 is likewise provided with a pipe 27 for the discharge of water, and a pipe 26 through which the solvent is discharged to the return pipe 24.

The recovered solvent may be transmitted through return pipe 24 to the separator 2, wherein dissolved water and acid formed in the solvent during its recovery in stills 12 and 17, may be removed from the solvent.

The recovered solvent, after being treated in the separator 2, may flow through pipe 3 to the solvent container 4 and thereafter be reused for subsequent extractions of oil in the manner heretofore described.

The return pipe 24 for the solvent may be provided with a by-pass 25 whereby solvent which is free of acid and dissolved water, may be returned directly to the solvent container 4.

It will now be understood that the solvent is transmitted in an endless course including the solvent container 4, the separating station including the separator 10, the solvent-recovery station including stills 12 and 17, and the return pipe 24 leading to the separator 2, or through the by-pass 25, and thence to the solvent container 4.

The separator 2 will remove acid and objectionable water from the new solvent and also from the recovered solvent. The system may, therefore, be continuously operated without danger of corrosion from the acid, and the solvent with the objectionable water removed, will provide the desired sharp separation between the oil fractions in separator 10.

As a specific example of one method of carrying out this invention, I will state that a chlorinated solvent, such as BB' dichlorethyl ether, may be employed to separate a Mid-Continent lubricating oil stock into fractions more paraffinic and more naphthenic than the original oil, while the objectionable acid and dissolved water are eliminated from the solvent before the latter reaches the oil to be treated.

BB' dichlorethyl ether containing .03 per cent hydrochloric acid and having a cloud point of 90° F., was percolated through 60 to 90 mesh fullers earth in separator 2. The BB' dichlorethyl ether passing from the separator 2 to the solvent container 4 was free of acid and had a cloud point of 42, i. e., the BB' dichlorethyl ether could be cooled to 42° F. without freeing any water.

About two parts of BB' dichlorethyl ether and one part oil may be agitated in the mixer 8 and allowed to settle into layers in the separator 10 at a temperature from 80° to 105° F. Since the cloud point of the solvent is considerably below the settling temperature, a sharp separation of the oil fractions is obtained. The BB' dichlorethyl ether will not free any water which might cause an emulsion with the oil and prevent a sharp separation.

The material discharged from the separator 10 through pipe 11 will be a high viscosity index lubricating oil, more paraffinic than the original oil; and the material discharged through pipe 16 will be more naphthenic than the original oil.

The temperature in the vacuum stills 12 and 17 may be about 280° F. during the first part of the run, and it may be desirable to thereafter increase this temperature to about 330° F. while introducing live steam through pipes 20 and 21. The free water may be removed from the BB' dichlorethyl ether in tanks 15 and 19, and the BB' dichlorethyl ether transmitted through the return pipe 24 to the separator 2, so as to remove any acid and objectionable dissolved water formed in the BB' dichlorethyl ether during its recovery in stills 12 and 17. The reconditioned BB' dichlorethyl ether may then be returned by pipe 3 to the solvent container 4 where it is ready for reuse in the extraction process.

To simplify the illustration, I have shown a single separating chamber 10, but it is to be understood that the paraffinic fraction of the oil may be subjected to successive mixing and separating operations, using additional quantities of fresh solvent; or the naphthenic solution resulting from one separating operation may be used in preliminary mixing and separating operations, so as to remove some of the naphthenic portions from the original oil before it is subjected to the treatment with fresh solvent.

In actual practice, I prefer to subject the fresh oil to a preliminary extraction, using the naphthenic solution of another extracting operation to remove some of the naphthenic constituents of the original oil. Thereafter, the oil from which these naphthenic constituents have been removed, is mixed with fresh solvent and permitted to settle, so as to remove additional naphthenic constituents from the desired paraffinic oil. As a specific illustration of the results obtained from such operations, I will refer to the extraction of a Mid-Continent lubricating oil, having a gravity of 26.4, a flash point of 405° F., a viscosity of 255 at 100° F., and a viscosity index of 75. This oil was mixed with the naphthenic solution resulting from a previous extraction, and after separating into a layer more paraffinic than the original oil and a layer more naphthenic than said original oil, the paraffinic layer was removed and mixed with fresh BB' dichlorethyl ether, using 2½ parts of the ether to 1 part of the oil. After being allowed to settle, the paraffinic portion was removed and distilled to recover solvent therefrom. The resultant paraffinic lubricating oil had a gravity of 30.8, a flash point of 425° F., a viscosity of 198 at 100° F., and a viscosity index of 100.

The original oil was treated with sulphuric acid and clay before subjecting it to the extracting process. The paraffinic and naphthenic products may be subjected to a light treatment with sulphuric acid, using about ¼ to ½ pound of the acid for each barrel of the oil, and thereafter contacted with a suitable adsorbent, or absorbent, material, such as fullers earth, or other suitable clay. When treated in this manner, both products are valuable lubricating oils, the greatest value being in the high viscosity index paraffinic oil, having a high resistance to sludging and carbon formation, but the low viscosity index naphthenic oil is quite satisfactory for use in machines that do not require a high viscosity index lubricant.

It is, of course, understood that suitable valves and pumps will be employed to efficiently control the transmission of the several fluids from one station to another, and a complete commercial system which may be a counter-current system will include numerous other details not shown in the accompanying drawing. However, this drawing is merely a diagrammatical illustration of one form of the invention, and in view of the foregoing disclosure, such details will be apparent to those skilled in the art. Furthermore, the invention is not restricted to such details, as it extends to various modifications within the scope of the terms employed in the following claims.

I claim:

1. In the art of separating mineral oil into fractions more paraffinic and more naphthenic than the original oil, the process of using acid-containing solvents which comprises percolating the solvent through fullers earth to remove the acid from the solvent, thereafter treating the oil with said solvent to effect a separation of the oil into fractions more paraffinic and more naphthenic than the original oil, separately distilling said fractions and treating said fractions with steam to recover the solvent, and percolating the recovered solvent through fullers earth to remove acid formed in the solvent during the recovery thereof.

2. In the art of separating mineral oil into fractions more paraffinic and more naphthenic than the original oil, the process of using solvents containing acid and dissolved water which comprises contacting the solvent with fullers earth to remove the acid from the solvent and to lower the cloud point of the solvent to a point below the temperature at which the oil is to be separated, treating the oil with said solvent to effect a separation of the oil into fractions more paraffinic and more naphthenic than the original oil, separately distilling said fractions and treating said fractions with steam to recover the solvent, and contacting the recovered solvent with fullers earth to remove acid and dissolved water formed in the solvent during the recovery thereof.

3. In the art of separating mineral oil into fractions more paraffinic and more naphthenic than the original oil, the process which comprises removing acid from a chlorinated solvent, treating the oil with said chlorinated solvent to effect a separation of the oil into fractions, and separating the chlorinated solvent from one of said fractions.

4. In the art of separating mineral oil into fractions more paraffinic and more naphthenic than the original oil, the process which comprises removing hydrochloric acid from a chlorinated solvent, treating the oil with said solvent to effect a separation of the oil into fractions, separating the solvent from said fractions, and thereafter removing the hydrochloric acid formed in said solvent during the separation of the solvent from the oil fractions.

5. In the art of separating mineral oils into fractions, the process of using a chlorinated solvent containing dissolved water which comprises lowering the cloud point of the solvent to a degree below the temperature at which the oil is to be separated, treating the oil with said chlorinated solvent to effect a separation of the oil into fractions, and removing chlorinated solvent from said fractions.

6. In the process of repeatedly using chlorinated solvents for the separation of mineral oil into fractions more paraffinic and more naphthenic than the original oil, the steps which include recovering the chlorinated solvent from the separated fractions, lowering the cloud point of the recovered chlorinated solvent so as to prevent a separation of water from the solvent during another separation of an oil with said solvent.

7. In the art of separating mineral oil into fractions more paraffinic and more naphthenic than the original oil, the process which comprises removing hydrochloric acid from dichlorethyl ether, treating the oil with said dichlorethyl ether to effect a separation of the oil into fractions, and separating the dichlorethyl ether from one of said fractions.

8. The process of repeatedly using dichlorethyl ether for the treatment of mineral oil having paraffinic and naphthenic constituents, which comprises treating the oil with the dichlorethyl ether to effect a separation of the oil into fractions more paraffinic and more naphthenic than the original oil, distilling one of said fractions to recover the dichlorethyl ether and treating said recovered dichlorethyl ether to remove the hydrochloric acid formed therein during the distilling operation.

9. In the art of separating mineral oil into fractions more paraffinic and more naphthenic than the original oil, the process which comprises percolating dichlorethyl ether through fullers earth to remove hydrochloric acid from the solvent, and treating the oil with said dichlorethyl ether to effect a separation of the oil into fractions more paraffinic and more naphthenic than the original oil, separately distilling said fractions and treating said fractions with steam to recover the dichlorethyl ether, and percolating the recovered dichlorethyl ether through fullers earth to remove hydrochloric acid formed in the dichlorethyl ether during the recovery thereof.

10. In the art of separating mineral oil into fractions more paraffinic and more naphthenic than the original oil, the process which comprises treating dichlorethyl ether to remove the dissolved water therefrom, extracting an oil with said dichlorethyl ether to effect a separation of the oil into said fractions, and recovering the dichlorethyl ether from one of said fractions.

11. In the art of separating mineral oils, the process which comprises lowering the cloud point of dichlorethyl ether to a point below the temperature at which the oil is to be separated, treating the oil with said dichlorethyl ether to effect a separation of the oil into fractions, and removing the dichlorethyl ether from said fractions.

12. In the art of separating mineral oil into fractions more paraffinic and more naphthenic than the original oil, the process which comprises removing hydrochloric acid and water from dichlorethyl ether treating the oil with said dichlorethyl ether to effect a separation of the oil into fractions, and separating the dichlorethyl ether from one of said fractions.

13. In the art of separating mineral oil into fractions more paraffinic and more naphthenic than the original oil, the process which comprises contacting beta beta' dichlorethyl ether with fullers earth to remove hydrochloric acid from said dichlorethyl ether and to lower the cloud point of said dichlorethyl ether to a point below the temperature at which the oil is to be separated, treating the oil with said dichlorethyl ether to effect a separation of the oil into fractions more paraffinic and more naphthenic than the original oil, separately distilling said fractions and treating said fractions with steam to recover said dichlorethyl ether, and contacting the recovered dichlorethyl ether with fullers earth to remove hydrochloric acid and water formed in the solvent during the recovery thereof.

14. The method of recovering BB', dichlorethyl ether by distillation from hydrocarbon oils mixed therewith, comprising neutralizing said BB', dichlorethyl ether before and after the distillation step.

HARRY T. BENNETT.